Feb. 26, 1963  F. M. MAYES  3,078,715
TANK GAUGE

Filed Nov. 30, 1956  5 Sheets-Sheet 1

FIG. I.

INVENTOR.
FRED M. MAYES
BY
ATTORNEYS

INVENTOR.
FRED M. MAYES

INVENTOR.
FRED M. MAYES

United States Patent Office 3,078,715
Patented Feb. 26, 1963

3,078,715
TANK GAUGE
Fred M. Mayes, Richardson, Tex., assignor to Sun Oil Company, Philadelphia, Pa., a corporation of New Jersey
Filed Nov. 30, 1956, Ser. No. 625,380
8 Claims. (Cl. 73—313)

This invention relates to tank gauges and has particular reference to temperature correcting means therefor.

While the invention is particularly adapted to tank gauges of the type described in the joint application of Fred M. Mayes and Jack Weir Jones, Serial No. 611,291, filed September 21, 1956, it will become evident that the invention is of broader applicability, though it will be described herein in its application to the tank gauge of said joint application.

Said application discloses a tank gauge which operates essentially as follows:

A float member is suspended in liquid in a tank and is connected through a flexible cable or tape to an elongated coded member the position of which corresponds to the position of the float. This coded member is scanned by photocells. In the operation of the gauge, the float is raised and when it leaves the surface of the liquid a signal is emitted. The signal then initiates the operation of the readout mechanism which receives pulses from the photoelectric scanning of the coded member. By means of successively acting stepping switches controlled by the pulses, there are provided selective inputs to an automatic printer and there are also set up selectively relays which also provide inputs to the printer. These inputs are in accordance with coding on the coded member which also serves to control sequential events in a cycle of operation. Finally, in the cycle the printer is operated to provide a record which corresponds to the liquid level or volme in the tank. Automatic recycling is provided at the beginning of an operation to restore all of the parts to initial position, the float being restored to its position in the liquid at the end of a cycle. Instead of using a printing calculator the results of the operation may be indicated by panel lights.

The general object of the present invention is to provide automatic temperature corrections to tank gauge readings. Volume measurements of petroleum products, for example, are normally corrected to a temperature of 60° F. Other products may be similarly corrected to standard temperatures peculiar to their particular industries. The data required to obtain a corrected volume for a particular storage tank are:

(1) A level or depth measurement, such as is provided by a tank gauge.

(2) Tank strapping tables, giving the tank volume versus liquid level. Since the majority of tanks are normally cylindrical, the volume is very nearly a linear function of the liquid level, with small correction terms due to small variations in tank diameter. Alternatively, the measurements, depending on level, may be automatically corrected to volume, the strapping corrections thus being effectively built into the gauge.

(3) The average temperature of the tank contents.

In accordance with the preferred form of the invention involving the type of tank gauge described in said joint application, there occurs a two-part cycle of operation. In the first part of the cycle the level or volume is delivered to a printing calculator as above outlined. Then in a second part of the cycle there is fed to the same calculator and added to the matter already therein the temperature correction corresponding to the particular level or volume which has been measured. The attainment of this general result is simplified by utilizing to provide the temperature correction input to the calculator many of the same decoding and control elements which are utilized for delivering the original level or volume reading thereto.

As will become evident hereafter, various aspects of the invention are of general applicability to tank gauges of considerably different types.

The further objects of the invention relate particularly to details of construction and operation which will become more apparent from the following description, read in conjunction with the accompanying drawings, in which:

FIGURE 6 is a fragmentary view showing the nature of the coding provided on a film utilized for level indications; and FIGURE 7 is a fragmentary view showing the nature of the coding provided on a film for temperature corrections, the edges of the film containing the feeding sprocket holes being omitted.

FIGURES 1 to 4 and 6 will be found to correspond either identically or closely to corresponding figures of said joint application. There will be described herein in detail only those parts of the gauging device which have to do particularly with temperature correction and the utilization of elements of the tank gauge. Master control and other details such as the signal initiating means are not described herein in detail but reference may be made to said joint application for an understanding of the details of construction, control and operation.

Figure 1:
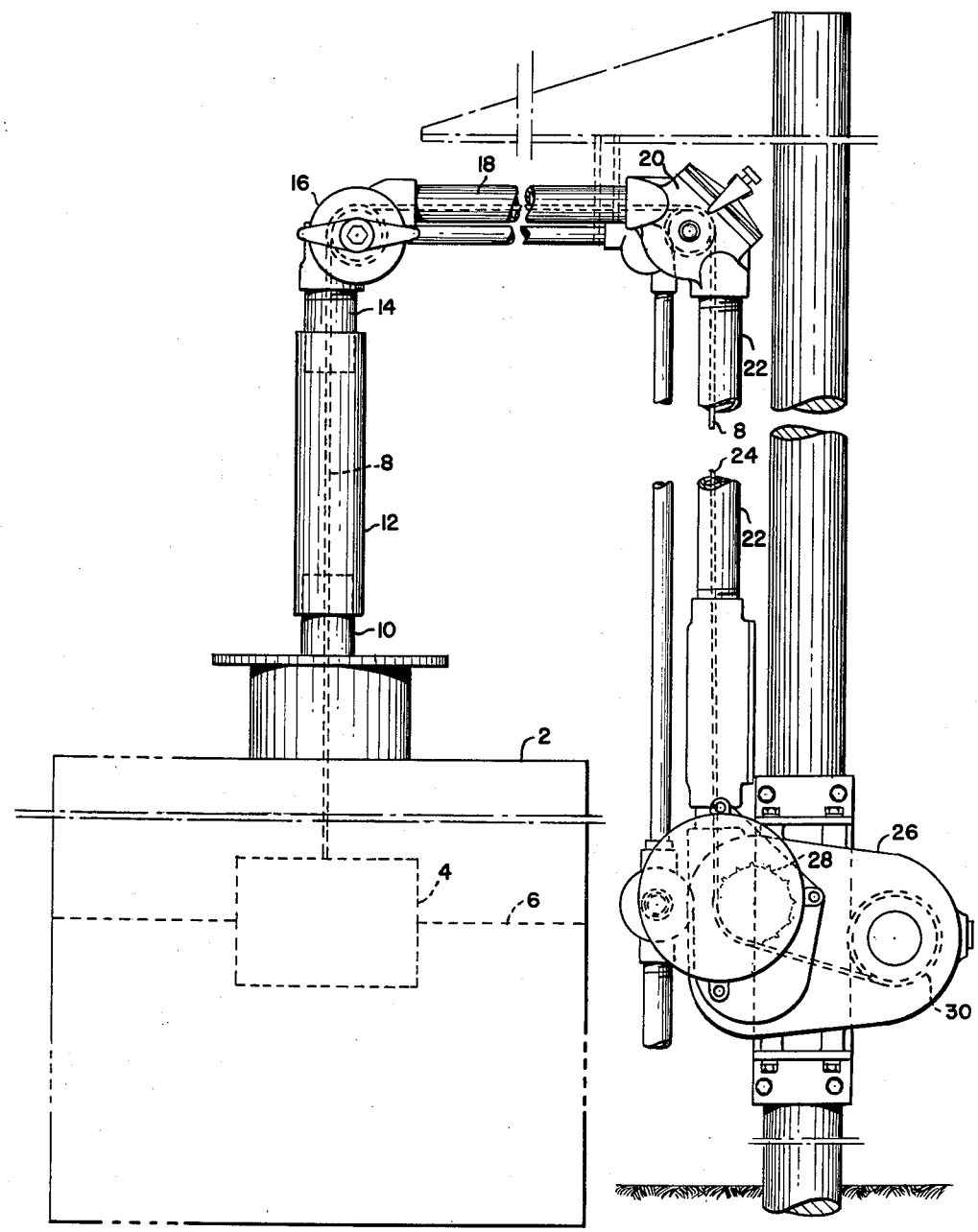
FIGURE 1 is a fragmentary view showing the transmitting apparatus associated with a tank which is to be gauged, the transmitting apparatus being that shown in said joint application.

Reference may first be made to FIGURE 1 for a general understanding of the tank gauge to which the invention is specifically applied in accordance with the later disclosure. There is indicated at 2 a tank which is to be gauged, there being provided in the tank a float 4 cooperating with the surface of liquid 6 the quantity of which is to be measured. The float 4 is controlled through a cable 8 which passes upwardly through a pipe fitting 10 at the tank top, thence through a flexible hose 12 and pipe connection 14, about supporting means within a fitting 16, thence generally horizontally through a pipe 18 and about a pulley located within a fitting 20 and thence downwardly within a pipe 22. Within the pipe 22 the cable 8 is continued in the form of a perforated metallic tape 24 which, within a housing 26, passes about a toothed sprocket 28 the teeth of which engage the openings in the tape 24. It then passes to a takeup reel of a spring motor 30 which is desirably of the well known type arranged to provide an approximately constant tension on the tape providing a counterbalance which would ordinarily maintain the float in an approximately constant rest position with respect to the liquid surface. The rest position of the float in the liquid is not critical since the critical relative position determinative of the location of the liquid level is the relationship at which the float leaves the liquid surface as it is raised. The spring motor 30 is provided only to maintain the tape 24 and cable 8 in tensioned condition so that the position of the sprocket 28 always bears an accurate relationship to the vertical position of the float, this being true throughout the large range of float movement, which may well range over 50 feet.

Driven proportionately to the sprocket 28 is a coded member 32 which is conveniently in the form of a film strip having an opaque area 34 provided with transparent areas, which will be hereafter referred to as openings, arranged in two series 36 and 38, with paired openings at intervals as indicated at 40. The respective series of openings are associated with photocells 44 and 42. For the sake of uniformity of description it may be assumed that the paired openings 40 occur at intervals along the film corresponding to displacements of the float of 0.1 foot. As shown in FIGURE 6, the openings of either one or the other of the series 36 and 38 occur at regular intervals, there being one of these at each opening interval. The openings 36 may be referred to as digit openings, and the openings 38 as zero openings, as will appear apt from consideration of the binary coding system which they represent. The length of each opening in the direction of the length of the tape is the same as the spacing between successive openings. Considering both the openings and the spaces between them, the intervals between corresponding ends of pairs 40 of the openings are subdivided into twenty-four equal spaces, and consistent with what has been said, this means that the length of each opening and the length of the space between each pair of openings corresponds closely to 0.004 foot of float displacement. Between the successive sets of openings 40 the digit and zero openings are coded to give a number corresponding to feet and tenths of feet of float height. It will be noted that along the righthand edge of FIGURE 6 there are numbers which may be considered assigned to the corresponding opening positions. The coding which has been found most convenient for providing input to either a light panel indicator or a printing recorder is one which involves the determination of each digit of a decimal system by means of combinations of binary digits. An opening in the series 36 represents the existence of a binary digit. An opening in the series 38 represents a zero for the corresponding binary digit. In this system, considering the successive opening positions above the lowermost pair of openings 40, it will be noted that the first four positions correspond to 0.1, 0.2, 0.4 and 0.8. Openings corresponding to the binary digits of this group then give the decimal digit in the tenths place. For example, the existence of an opening 36 of this group only in the 0.8 position, as illustrated, indicates that the decimal digit is 0.8. Above the group of digits just referred to, there then appear the positions numbered 1, 2, 4 and 8. In this series openings of the zero group 38 only appear. This means that in the units position the decimal digit is zero. Above this group of positions are the positions designated 10, 20 and 40. Here the digit openings appear in the positions at 10 and 40 indicating the decimal digit 5 in tens position. The complete coding for the interval under discussion is, therefore, 50.8. The next interval above this is similarly coded for 50.7 and so on in succession along the film.

Figure 2:
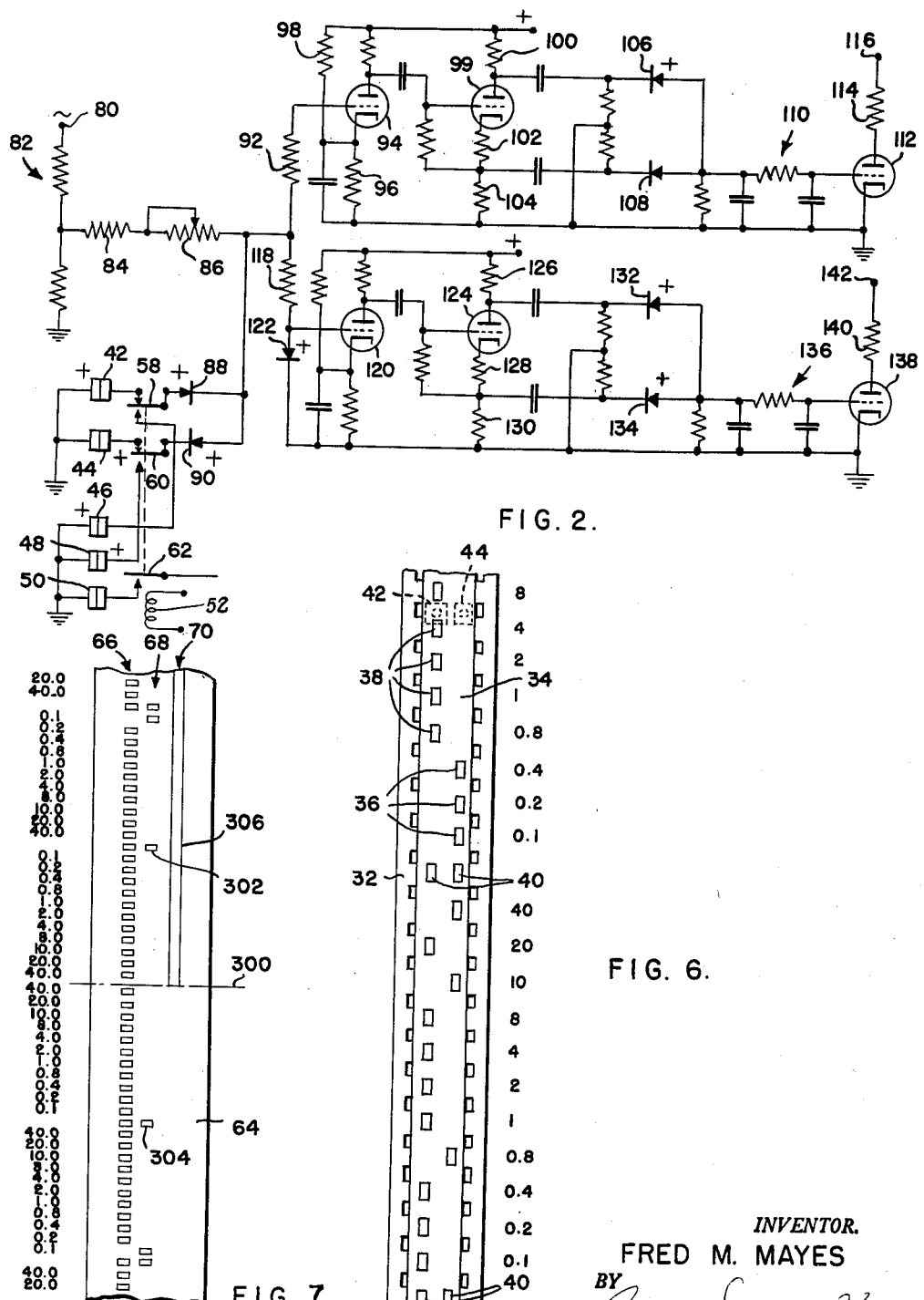
FIGURE 2 is a wiring diagram showing photoelectric signal pickup means in its associated circuitry.

The coded film illustrated in FIGURE 6 is that from which liquid level is read, though the coding may be such as to give directly a reading in volume. A similar coded film, but of relatively short length, is used for the readout of temperature corrections. The readout for these corrections is accomplished by photocells 46 and 48, corresponding respectively to photocells 42 and 44. In the temperature correction system a third photocell 50 is provided which is associated with a third line of openings to indicate merely positive or negative sign for the correction. A relay 52 is provided with a series of contact members 54, 56, 58, 60 and 62. Its function is essentially that of transferring readout from the tank gauge to the temperature correction devices. As illustrated in FIGURES 2 and 5, the members 58 and 60 serve to switch alternatively into an output circuit the pairs of photocells 42 and 44 or 46 and 48. The film record member which is read by the photocells 46, 48 and 50 is indicated at 64 and comprises a series of openings 66 and 68 and a channel 70 containing only a single opening, the last being for indication of sign and controlling the calculator to either add or subtract as well as a motor hereafter referred to. For this latter purpose the output of photocell 50 is delivered to the amplifier and relay 72 of conventional type, from which a signal is provided at 74 to the add-or-subtract control of the calculator 76 and also for motor reversal. In FIGURE 5 there is indicated at 78 under the designation "stepping switches" circuitry which comprises what is shown in the present instance in FIGURES 2, 3 and 4. While this circuitry is fully described in detail in the joint application referred to above, to aid in following the operation of the present devices certain portions thereof will now be briefly described.

The photocells referred to are desirably and conveniently phototransistors, and their connections and operation are as follows:

An alternating sixty-cycle potential with respect to ground is provided at terminal 80 and through voltage divider 82 and through the fixed and variable load resistors 84 and 86 applies a potential to a photocell and diode arrangement. In series with the phototransistors, selectively paired by the relay contact members 58 and 60, are diodes 88 and 90 polarized to correspond to the polarization of the photocells, the diodes blocking reverse currents through the photocells. The feed to the photocell diode combinations is in parallel so that, if illumination is present, the photocell 44 (or 48) is conductive during a positive half cycle of applied voltage and the photocell 42 (or 46) is conductive during a negative half cycle. The conductance of each photocell is so high, that, in effect, during conductive conditions they ground the right hand end of resistor 86. As will appear in greater detail hereafter, the signals appearing at the right hand end of resistor 86 may be of any one of four types. If there is no light on either photocell of a pair the signal is full wave sixty-cycle. If there is light on photocell 42 (or 46) and not on photocell 44 (or 48) the signal is positive half wave. If there is light on photocell 44 (or 48) but not on photocell 42 (or 46) the signal is negative half wave. With light on both photocells there is only a small sixty-cycle ripple resulting from incomplete grounding.

The right hand end of resistor 86 is connected through resistor 92 to the grid of the triode 94 which is biased to cut off (by reason of connection of its cathode to the junction of resistors 98 and 96 connected between ground and the positive supply terminal), so as to pass only positive signals appearing at its grid, i.e., resulting from the full wave and upper half wave type signals described. The amplified signals are fed to a second triode 99, which triode has an anode load resistor 100 and a pair of cathode load resistors 102 and 104, the outputs from the anode and from the junction of the cathode resistors being fed through the rectifying diodes 106 and 108 for supply, through filter 110, of a negative direct potential to the grid of triode 112 which is connected through resistor 114 to the terminal 116. The two types of signals just mentioned produce cut-off of the triode 112.

The right hand end of resistor 86 is also connected through resistor 118 to the grid of a triode 120, the cathode resistor of which has a low value so that this triode is normally conducting. The grid of triode 120 is connected to ground through a diode 122, polarized as indicated with its anode connected to the grid, and the result is a substantial response of the triode 120 only when the signals are of the full wave and lower half wave types previously mentioned. The signals due to the ripple signals are negligible. The output from triode 120 is delivered to a triode 124 provided with the anode load resistor 126 and the cathode resistors 128 and 130.

The anode of triode 124 and the junction of the resistors 128 and 130 supply outputs to the rectifying diodes 132 and 134 which through filter 136 provides direct signals to the grid of triode 138, the anode of which is connected through resistor 140 to terminal 142. The triode 138 is cut off by the negative potential appearing at its grid when the inputs are of the full wave and lower half wave types.

Figure 3:
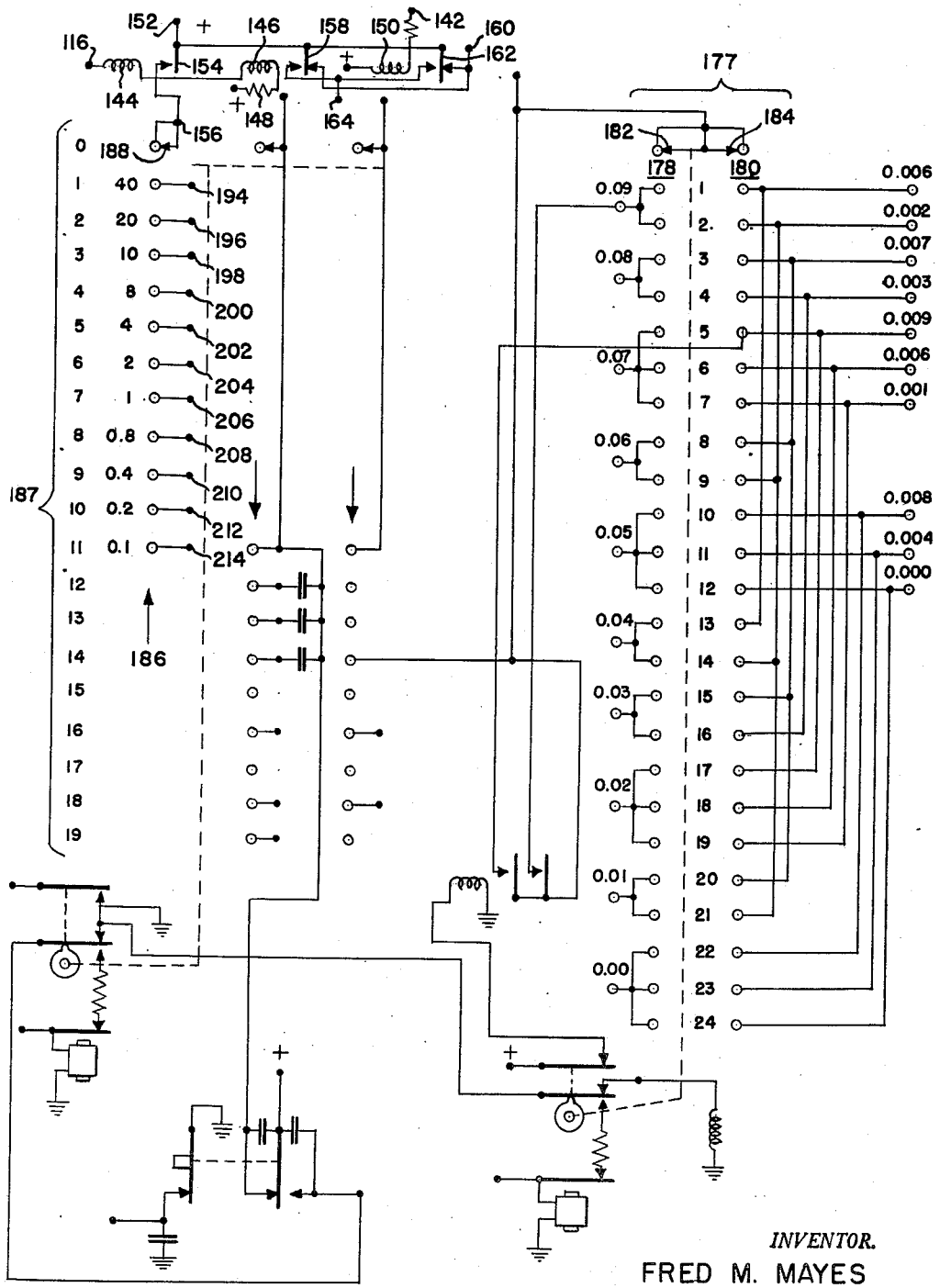
FIGURE 3 is a wiring diagram showing certain control and decoding devices and the association of the latter with inputs to indicating or recording means.

Reference may now be made to the set of relays indicated at the topmost portion of FIGURE 3. The coils of two relays 144 and 146 are connected in series with a current-limiting resistor 148 between the terminal 116 and a positive potential source. The coil of a relay 150 is connected between the same or different positive potential source and the terminal 142 with the interposition of a current-limiting resistor. A positive potential source 152 is connected to the movable contacts 154, 158 and 162 of the respective relays just mentioned. When the relay 144 is energized its movable contact 154 supplies positive potential to a terminal 156. When either the relay 146 or the relay 150 is deenergized, the positive potential from terminal 152 is supplied to a terminal 160. When either the relay 146 or the relay 150 is energized, the positive potential is applied to a terminal 164.

The terminals 164 and 160 are connected through the windings of respective relays to ground. The last mentioned relays form part of a master control which is indicated in FIGURE 5 at 168. This master control is shown in FIGURE 12 of said joint application and is fully described therein. Its function is the proper sequential control of events in a cycle of operation and it forms merely a somewhat arbitrary part of the system so far as the present invention is concerned and might well be replaced by other cycle controlling devices which may be time sequenced under the action of input signals. As a consequence it need not be described in detail though it functions during the cycle of operation will be hereafter set forth. In said joint application there is also involved in this master control various devices to indicate or nullify improper operation, and these form no part of the present invention. However, since the outputs of the terminals 160 and 164 have fundamental functions in connection with the illumination of the photocells, the operation may now be described, referring to what has been said with respect to the circuit arrangements shown in FIGURE 2, and considering the relays 144, 146 and 150 and their connections to the terminals 160 and 164. Illumination of a photocell through a digit opening of one of the films results in current flow through the coil of relay 144 and, accordingly, the appearance of a positive potential at the terminal 156. This is also true when a photocell is illuminated by the passage of a pair of openings such as 40 or 69. Accordingly, the terminal 156 receives a positive signal upon the passage by a photocell of every opening of the digit groups. At all other times the terminal 156 is deenergized. Thus the terminal 156 may be said to receive digit signals from the film openings.

The coil of relay 146 is energized whenever the coil of relay 144 is energized. The coil of relay 150, however, is energized only when a photocell is illuminated by a zero opening, including the openings of the zero series occurring in paired openings as to 40, 302 or 304. When both photocells of a pair are not illuminated, both of the relays 146 and 150 are deenergized.

Since both relays 146 and 150 are energized only upon the occurrence of the double pulses from both the digit and zero series of openings the terminal 160 and the relay connected thereto are deenergized only at such times, the last mentioned relay at all other times being energized either through one or both of the contacts 158 and 162. The terminal 164 and the relay connected thereto are energized when either or both of the relays 146 and 150 are energized. Accordingly, the last mentioned relay receives a pulse for the passage of any opening, either digit or zero, past the position of the photocells, so that the terminal 164 and the relay connected thereto, in effect, count each opening position on the film, including the positions of the double openings.

Summarizing the above, the terminal 156 provides positive signals corresponding to the digits on a film; the relay connected to terminal 164 by its energization counts the opening positions on a film; and the relay connected to terminal 160 indicates by its deenergization the passage of a double opening by the photocells of the pair.

The master control 168 has another input which need not be described herein in detail though it is described in said joint application. This input from terminal 170 receives a signal when the float 4 leaves the liquid 6 by virtue of the cessation of change of tension on the support 8 when this occurs. Sensitive to the tension is a support within the housing 16. When the tension transient corresponding to the leaving of the liquid surface by the float occurs a thyratron discharge provides an initiating signal at terminal 170.

Diagrammed at 172 and designated "motor control" is what amounts to no more than a relay operated by the master control 168 to effect energization of a motor through terminals 174, there being also desirably involved the energization of a clutch which couples the motor to the sprocket 28. This motor, as described in the joint application, effects the rise of the float 4 after the cycle is initiated. In the present case, the output of the motor control 172 is switched alternatively either to the terminals 174 controlling the float-lifting motor or to a motor 176 through the switch members 54 and 56 of relay 52. The function of motor 176 will be later described.

Reference may now be made to FIGURE 3 which corresponds to FIGURE 11 of said joint application though various parts of the figure need not be described herein since they have no direct bearing on the present invention and are involved primarily in the master control. A stepping switch generally designated 177 comprises two sets of contacts indicated at 178 and 180 which are respectively engaged by energized wipers 182 and 184. Through the master control the wipers are simultaneously advanced along the contacts. Associated with terminals connected to the contacts in FIGURE 3 are indications of values corresponding thereto. The terminals are connected to digit input terminals of the printing calculator 76. The left hand set of contacts 178 are connected in pairs or triplets as shown with assignment of digits in hundredths place as indicated. The right-hand set of contacts 180 are connected in various combinations with output terminals to which digital values are assigned, the digits in the case of these terminals corresponding to thousandths. As described in said joint application, successive subtraction is effected in the form of complementary addition, and if there are followed the connections successively achieved by the movements of the wipers 182 and 184 to the successive contacts in numerical order it will be found that the outputs are successively 0.096, 0.092, 0.087, etc., progressing at intervals of four or five thousandths down to 0.000 corresponding to the contact at the position 24. The apparatus herein specifically disclosed is designed to give a reading accuracy to the nearest 0.004 foot, and the successive steps are designed to effect this end.

A stepping switch 187 is indicated at the left of FIGURE 3. In connection with the present invention there need only be described what is involved in engagement of contacts of a series 186 by the wiper 188 connected to the terminal 156.

Figure 4:
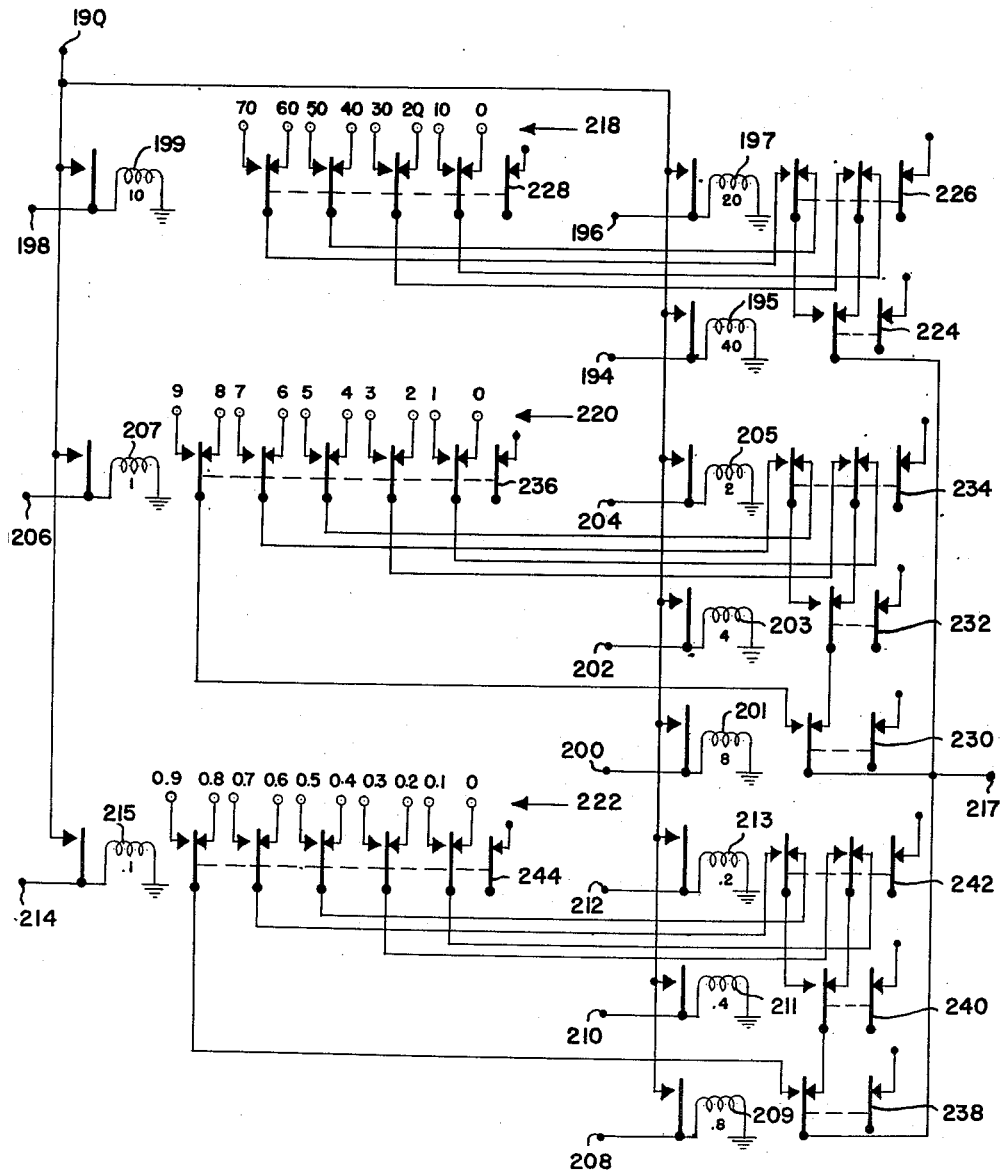
FIGURE 4 is a wiring diagram showing particularly a set of decoding relays and their connections.
Figure 5:
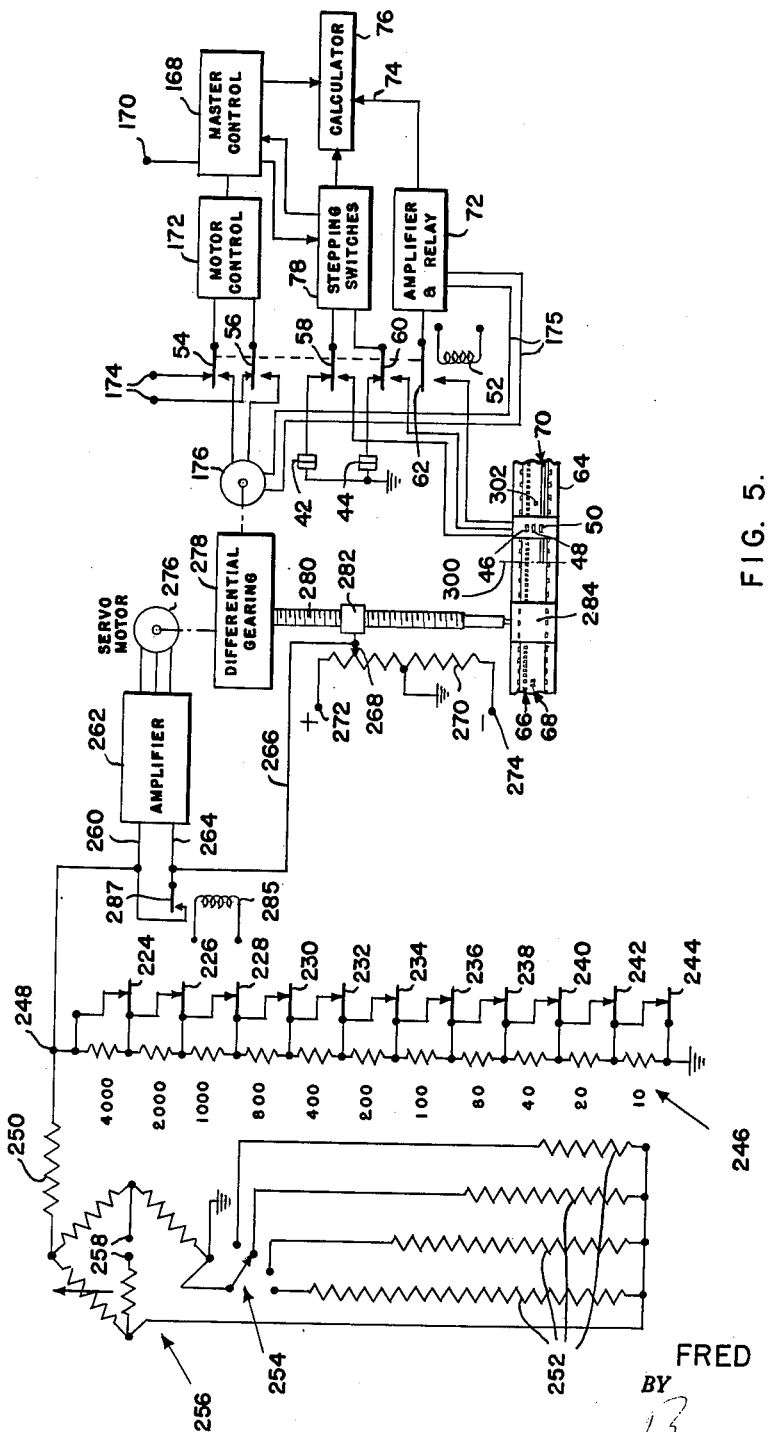
FIGURE 5 is a wiring and mechanical diagram showing particularly the elements associated with the matter of temperature correction together with interconnections to other parts of the gauging device.

Referring now to the elements shown in FIGURE 4 which are also part of what is diagrammed as 78 in FIGURE 5, it will be noted that the first eleven contacts of the series 186 are connected to terminals 194, 196, 198, 200, 202, 204, 206, 208, 210, 212 and 214 which are the respective terminals of the coils of relays 195, 197, 199, 201, 203, 205, 207, 209, 211, 213 and 215. The contacts of the series 186 correspond to the decimal digital values indicated in association therewith.

The contacts in positions 1, 2 and 3 are thus indicated as having the assigned values 40, 20 and 10. Referring to the set of relays 195, 197 and 199, it will be found that when these relays are respectively individually energized, the input from a terminal 217 will be respectively delivered to the terminals of the series 218 which are assigned the values 40, 20 and 10, and if combinations of the relays 195, 197 and 199 are energized, the outputs to the terminals 218 will correspond to the sum of the assigned values for the input terminals of the relays. Thus by combinations of energization of these three relays there are secured digits in the tens place running from 0 to 7, the digit being zero when all three relays are deenergized. The terminals indicated at 218 are input terminals of the tens bank of the light bank or printer 76.

The relays 201, 203, 205 and 207 form another group which supply inputs in the units position in the light panel or printer, the terminals being indicated at 220. By following the connections shown in association with this group of relays, it will be evident that the relays 201, 203, 205 and 207 correspond to the digits 8, 4, 2 and 1. In the case of the relay 201 this may only be associated with the relay 207 to give rise to the digits 8 and 9. The other relays are arranged to be associated as described above and will then give the digits running from 0 to 7.

The third set of relays 209, 211, 213, and 215 correspond precisely to those just discussed, and the connections are the same to give the digits in the tenths position to the light panel or printer input terminals indicated at 222.

The arrangements described may, of course, be extended as desired, the description here applying to a gauging system capable of measuring depths ranging up to eighty feet, and hence the uppermost relay arrangement in FIGURE 4 is only carried out to the extent of providing an output of seventy.

As will appear hereafter, what has just been described, serves for decoding of the coded openings in the 0.1 foot intervals of the film 32.

The comparison of FIGURE 4 with FIGURE 13 of said joint application will show that each of the relays of the series 195 to 215 is provided with an additional contact, these contacts being respectively, in the order of numbering of the relays, 224, 226, 228, 230, 232, 234, 236, 238, 240, 242 and 244. These contacts are connected in series as indicated in FIGURE 5 and, in order, shunt resistors of a series 246 connected between ground and the terminal 248. If a resistance 250 connected to terminal 248 has a high resistance value, for example, one megohm, the resistances in ohms of the various resistors 246 may be as indicated adjacent to them, the resistance values indicated being, it will be noted, one hundred times the digital values which have been indicated as ascribed to the relays the contacts of which shunt the respective resistors.

Located within the tank 2 are temperature-sensitive resistances of known type constituting resistance thermometer elements. As is usual in the utilization of such elements, there are a number of them provided to correspond to different liquid levels in the tank so as to give truer indications of average temperature of the liquid. Selected by a switch 254 is the longest of the resistances 252 which is wholly submerged in the liquid. The resistances have the same value of resistance at a given temperature and consequently are electrically interchangeable, and by selection of switch 254, which may be manual or automatic, they are selected into one arm of a resistance bridge 256 which is energized at 258 with alternating or direct current and which delivers an output between ground and the left hand end of resistor 250 previously mentioned.

Adjustment of the bridge is initially made so that if the temperature of the liquid in the tank is the standard temperature for measurement, e.g., 60° F., the bridge output is zero, being positive or negative (or changing phase if the excitation is alternating) to give a measure of divergence of the temperature of the liquid from the standard temperature. The temperature deviation signal is then in effect multiplied by the depth of liquid in the tank by the insertion between terminal 248 and ground of a total resistance corresponding to the depth of liquid. That this is the case, through the action of the relays, will appear hereafter. The signal appearing at terminal 248 is applied at 260 to one input terminal of an amplifier 262, the other input terminal of which is connected at 266 to the movable contact 268 of a resistor 270 which is grounded at its central portion and has its terminals 272 and 274 respectively positive or negative or, if alternating excitation is involved, of reverse phase relationship.

The amplifier 262 drives a servomotor 276 in one direction or the other determined by the difference in potentials of the amplifier input terminals 260 and 264. This motor 276 provides one input drive to differential gearing 278 which receives another input drive from motor 176. The output of the differential gearing is connected to a screw 280 which carries a nut 282 mounting the contact 268 to traverse it upwardly or downwardly on resistance 270 depending upon the direction of rotation of the screw 280. A sprocket 284 having the screw 280 as its shaft (with the interposition of reduction gearing, not shown) serves to advance the coded film 64 in one direction or the other.

A relay 285 energized concurrently with the relay 52 serves to operate its contact 287 to short the input of amplifier 262.

As has been already stated, the complete cycle of the described apparatus has two parts, in the first of which there are delivered level or volume measurements and in the second part of which there are delivered temperature corrections. For the sake of uniform description, it will be hereafter assumed that liquid level measurements are involved and that the corrections are in terms of level corrections. However, it will be evident that the results may be given in terms of volumes and temperature corrections of volumes.

The first part of the cycle may be described briefly as follows, reference being made to said joint application for details which are not material to the present invention.

Relay 52 is deenergized, which means that the pertinent parts of the circuit are as disclosed in said joint application. Relay 285 is also initially deenergized with the production of results during the first part of the cycle as pointed out hereafter.

Switch 254 is selected to a position such that there is connected into the circuit the particular resistance 252 which is of the maximum length completely submerged in the tank liquid. By this selection an optimum temperature indication is obtained. The switch 254 may, in general, be manually positioned since the depth of liquid in the tank will generally be approximately known from previous measurement. However, it will be evident that the switch 254 may be automatically adjusted in accordance with depth measurements.

The operation may be conveniently initiated by a push button which is held depressed until a signal is given indicating that the active part of the cycle may properly begin. During the pressing of the push button the homing of stepping switches 177 and 187 takes place. Following this, and upon release of the push button, the motor and clutch for raising of the float are energized, and there is also energized the lamp which serves for the operation of the photocells 42 and 44. The ensuing operations are then essentially idle ones until the float breaks from the surface of the liquid whereupon a signal is delivered to the master control 168 from terminal 170 to initiate the useful part of the cycle.

The stepping switch 177 starts advancing one step upon passage by the photocells 42 and 44 of both the beginning and end of each opening or pair of openings in film 32. This results from the doubling of the pulses produced through the photocells 42 and 44 appearing at the terminal 164, a step occurring upon both energization and deenergization of this terminal.

The occurence of the first double pulse due to openings 40 deenergizes the terminal 160 which, through the master control, results in stoppage of the stepping of switch 177 and the initiation of stepping of switch 187, the latter being stepped once for every opening position of the film 32. Contacts of the group 186 are selectively energized to correspond with digit openings only, and the relays of FIGURE 4 are thus set up in accordance with the code between the first double pulse referred to and the following double pulse.

The results of the stepping actions may be summarized as follows:

Starting effectively from a numerical value of 0.100, each step of relay 177, corresponding to the beginnings and ends of the film openings, has subtracted 0.0004 or 0.005 foot, the stepping terminating with that step corresponding to the entry of a double opening into the position of the photocells. The result is energization of the terminals of the groups 178 and 180 to give hundredths and thousandths digits to be added to tens, units and tenths digits for a complete indication.

During the first eleven steps of relay 187, the binary-decimal outputs resulting from passage of the digit openings by the photocell position will set up the relays shown in FIGURE 4 to energize the tens, units and tenths terminals 218, 220 and 222 to correspond to the coding in the film interval scanned.

Thus, at the completion of the eleventh step of relay 187 the energization either for lamp indication or for printing machine operation should be fully set up.

As described in said joint application, provision is made for avoiding an error under the special condition of presentation of a double opening to the photocells at the time stepping would ordinarily be initiated. This need not be specially described since it is not concerned directly with the present invention.

The twelfth step of relay 187 should involve a double pulse. If that does not occur the operation is interrupted and a signal of misoperation is given as described in the joint application. If a double pulse is secured on the twelfth step, the operation proceeds through steps 14 to 19 to provide an output to a printing calculator or to a lamp bank. Since the operation is somewhat more elaborate for a printing calculator, it will be assumed that such output is here involved. The output involves first the entry of the digits in the keyboard of the printer followed by the actuation of the subtotal actuator. This involves a minor difference as compared with the operation described in the joint application in which the total actuator would be here operated. In the present instance, however, it is desired to add to the first accumulation the correction which follows, and hence the subtotal actuator is energized.

The last step of switch 187 results in denergization of the clutch and float-lifting motor so that the float drops back into the liquid. As described in the joint application, the entire apparatus is then cleared, except that the stepping switches are not brought to their home positions. This ends the first part of the cycle, the second part being arranged to be initiated by manual pressing of the same or a different push button. However, the second part of the cycle may, in obvious fashion, be initiated automatically immediately upon completion of the first part.

Before proceeding with description of the second part of the cycle, there may be described what has occurred in the first part of the cycle with particular reference to the temperature correcting means.

At the beginning of the operation described above, the relays shown in FIGURE 4 were deenergized, and consequently the terminal 248 was shorted to ground through the relay members 224 to 244. The contact 268 would, in general, be initially off zero position with the result that the amplifier 262 would receive a signal causing it to drive the servomotor 276 to bring contact 268 to zero position. This results in a zero positioning of the film 64.

When the relays of FIGURE 4 are fully energized, by the completion of stepping of switch 187 through its eleventh contact, there appears at 248 a potential proportional to the temperature deviation from 60° F. times the depth indicated by the energized relays and, therefore, the non-shorted resistors 246. (It may be noted that since the temperature correction is only a minor correction to the depth measurement, the determination of depth for this correction need not be more accurate than 0.1 foot, and hence the information accumulated in the relays in FIGURE 4 is sufficient.)

As the relays are successively energized by the stepping of switch 187, the motor 276 operates to maintain approximately throughout this operation zero input to the amplifier 262 by moving the contact 268, and the film is concurrently moved to correspond so that its final position when all relays are energized corresponds to the value of the potential at 248. The motor 276 achieves this result rapidly so that the final position of film 64 is accurately attained before the first part of the cycle is completed to clear the relays in FIGURE 4. Concurrently with the end of the first part of the cycle the relays 52 and 285 are energized. The relay 285 shorts the input to the amplifier 262 preventing further operation of the motor 276 even though the contact 268 is displaced from zero when the relays in FIGURE 4 open. The result is that the film 64 retains the information of temperature and depth despite the cutting off of the source of this information at the end of the first part of the cycle.

The readout of the temperature correction may now be initiated manually or automatically. In either case, the stepping switches are initially returned to their home positions in the same fashion as in the beginning of the first part of the cycle.

Reference may now be made to FIGURE 7, which figure illustrates the coding of the film 64 in the vicinity of the portion presented to the photocells 46, 48 and 50 when zero temperature correction is required. The position on the film aligned with the photocells for zero correction is indicated at 300. Zones are indicated by the openings in the series 66 and digits by the openings in the series 68. It will be noted that above and below the position 300 the first openings 302 and 304 in the digit series actually correspond to zero digits, and merely provide double openings for initiation of a reading operation. Above the position 300 the channel 70 is provided with a single opening 306 through which the photocell 50 may be energized. For positions below 300 this photocell will be deenergized. Energization of photocell 50 determines, through the amplifier and relay 72 that the correction should be added and that the motor 176 is to operate in a direction to cause the film 64 to move downwardly (as viewed in FIGURE 7) past the photocells. Deenergization of the photocell 50, on the other hand, provides that the correction should be substracted and effects control of motor 176 to move the film upwardly (as viewed in FIGURE 7) past the photocells. The correction 175 from the amplifier and relay 72 to the motor 176 may effect reversal of phase of current in its field windings to provide motor reversal. The reason for the particular arrangement of openings in the film 64 is because the scanning must be in the direction of numerically increasing corrections from the zero position 300. The coding will be readily understood by reference to the equivalent values of the openings indicated at the left of this figure.

When the homing of the stepping switches is completed the motor 176 is actuated just as the float controlling motor was during the first part of the cycle, the motor 176 now being connected to the motor control 172 through the operation of relay 52, the direction of operation of the motor being determined by the energization delivered through connection 175. An initiating singal is now delivered to terminal 170 of the master control, but this may be delivered automatically as soon as the stepping switches are in home position, as contrasted with the signal delivered in the first part of the cycle due to the breaking of the float from the liquid surface.

The operation is then identical with that previously described for the first part of the cycle with the exception that the film 64 rather than film 32 controls stepping first of switch 177 and then of switch 187, i. e., switch 177 steps until a first double pulse is encountered (which, if the film starts near its zero correction position may be at 302) and then switch 187 steps until a second double pulse is encountered. The information stored, however, is from the openings 66 and 68 which are located and coded to indicate the proper temperature correction resulting from the initial positioning at the beginning of this second part of the cycle of the film 64.

Following the eleventh step of switch 187, the test for a double pulse occurs and the information is set into the keyboard of the printing calculator as before. Then this information is added or substracted to that previously in the calculator depending upon the output through the amplifier and relay 72 determining the sign of the corrrection. Finally, the printing operation is effected, giving the corrected reading.

At the end of this second part of the cycle the parts are then restored to their original conditions except that the stepping switches are not returned to home positions and the film 64 will remain in the position determined by the operation of motor 176.

If the output is by way of a lamp bank or banks, it will be evident that the simplest operation would involve two separate banks of lamps for the original depth or volume measurement and for the correction, respectively. However, if a lamp bank of known type is used which is controlled from a circuit from which addition or subtraction may be secured, the set-up originally secured in the first part of the cycle may have algebraically added to it in the second part the corrections.

It will be evident that in accordance with the invention there has been provided means for automatically correcting depth or volume readings in accordance with the product of temperature deviation by the depth or volume, a factor of proportionality being introduced by the particular coding of a member such as 64 and its driving means. It will be obvious that the invention is more broadly applicable than to the particular type of tank gauge disclosed in said joint application and herein. It will also be evident that various changes may be made in details by those skilled in the art without departing from the invention as defined in the following claims.

What is claimed is:

1. In combination with a tank containing material; means providing a variable resistance, means responsive to the quantity of material in the tank for varying said resistance approximately proportionally to the quantity of said material in the tank, means responsive to the temperature of said material and providing through said resistance a flow of current approximately proportional to the deviation of temperature of said material from a normal temperature, and means responsive to the potential across said resistance, to provide an output approximately proportional to the mathematical product of said quantity multiplied by said deviation.

2. In combination with a tank containing material, means responsive to the temperature of the material in the tank and providing an output approximately proportional to the deviation of temperature of said material from a normal temperature, means responsive to the quantity of said material in the tank, a variable impedance controlled by the output of one of said means in proportion thereto, the other of said means being connected to said impedance and providing its output in the form of current flowing through said impedance, and means responsive to the potential across said impedance and providing a third output approximately proportional to the mathematical product of the multiplication of the first two outputs.

3. Gauging means comprising a bouyant element responsive to position of level of said liquid, a member containing coded markings positioned in accordance with the position of said buoyant element, readout means providing an output constituting a measure of said position including means responsive to said coded markings, means responsive to said readout means and to the temperature of said liquid for positioning a second member containing coded markings in accordance with the product of quantity of said liquid by the deviation of the temperature thereof from a normal temperature, and readout means for said second coded member.

4. Gauging means according to claim 3 in which the two readout means differ substantially solely in their input connections and in which means are provided for alternately connecting said input connections to read the first or the second of said coded members.

5. Gauging means comprising a buoyant element immersible in a liquid and responsive to position of level of said liquid, a member containing coded markings positioned in accordance with the position of said buoyant element, readout means including means responsive to said coded markings, means responsive to said readout means and to the temperature of said liquid for positioning a second member containing coded markings in accordance with the product of quantity of said liquid by the deviation of the temperature thereof from a normal temperature, and means effecting a cycle of operation in which said readout means first responds to the first coded member to provide a measure of quantity of liquid and provides said measure to the positioning means for the second coded member, and in which said readout means then responds to said second coded member.

6. Gauging means according to claim 5 in which a calculator is connected to receive successively the outputs of said readout means resulting from its responses to said first and second coded members.

7. Gauging means according to claim 6 in which said calculator adds said outputs.

8. Gauging means according to claim 5 in which said readout means scans limited portions of said coded members.

References Cited in the file of this patent

UNITED STATES PATENTS

| | | |
|---|---|---|
| 1,788,465 | Lamar | Jan. 13, 1931 |
| 2,073,948 | Schofield | Mar. 19, 1937 |
| 2,132,213 | Locke | Oct. 4, 1938 |
| 2,273,850 | Ewald | Feb. 24, 1942 |
| 2,551,792 | De Giers et al. | May 8, 1951 |
| 2,629,261 | McKinney | Feb. 24, 1953 |
| 2,677,276 | Schmidt | May 4, 1954 |
| 2,694,930 | Lamb | Nov. 23, 1954 |
| 2,758,474 | McKinney | Aug. 14, 1956 |